United States Patent
Asai et al.

(10) Patent No.: US 7,471,421 B2
(45) Date of Patent: Dec. 30, 2008

(54) METHOD OF GENERATING THRESHOLD MATRIX AND RECORDING MEDIUM STORING DATA OF THRESHOLD MATRIX

(75) Inventors: Hiroshi Asai, Kyoto (JP); Yasuhiro Takemoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 634 days.

(21) Appl. No.: 11/208,631

(22) Filed: Aug. 23, 2005

(65) Prior Publication Data

US 2006/0077469 A1   Apr. 13, 2006

(30) Foreign Application Priority Data

Oct. 8, 2004   (JP) .............................. P2004-296182

(51) Int. Cl.
*H04N 1/405* (2006.01)
(52) U.S. Cl. ..................................... 358/3.06; 358/3.13
(58) Field of Classification Search ................ 358/3.13, 358/3.16, 3.19, 3.2, 535, 536
See application file for complete search history.

(56) References Cited

U.S. PATENT DOCUMENTS

| | | | |
|---|---|---|---|
| 5,124,803 A | 6/1992 | Troxel | |
| 5,859,955 A | 1/1999 | Wang | |
| 6,128,099 A | 10/2000 | Delabastita | |
| 6,680,786 B1 * | 1/2004 | Sato et al. | 358/3.18 |
| 6,724,499 B1 * | 4/2004 | Satoh | 358/1.9 |
| 6,989,913 B2 * | 1/2006 | Asai | 358/1.9 |
| 2005/0264834 A1 * | 12/2005 | Asai et al. | 358/1.9 |

FOREIGN PATENT DOCUMENTS

| | | |
|---|---|---|
| EP | 1 111 905 A | 6/2001 |
| EP | 1 601 182 A | 11/2005 |
| JP | 2001-186346 A | 7/2001 |
| JP | 3427026 B2 | 5/2003 |

OTHER PUBLICATIONS

Masao IRI (Supervisor), "Bit, Computational Geometry and Geographic Information Technology," Sep. 10, 1986, pp. 163-168, Kyoritsu Shuppan Co., Ltd. (Attached English Translation).
European Search Report issued in Patent Application No. 05018414.2-2002/1646222 dated on Oct. 7, 2008.

* cited by examiner

*Primary Examiner*—Thomas D Lee
(74) *Attorney, Agent, or Firm*—McDermott Will & Emery LLP

(57) ABSTRACT

In a matrix area (720), a plurality of highlight-side dot centers (731) and a plurality of shadow-side dot centers (741) are regularly arranged and a plurality of reference points (751) are set while being distributed almost uniformly. Each of the dot centers (731, 741) is rotated about a nearest reference point (751). Threshold values of the matrix area (720) are determined so that halftone dot areas should be changed around a plurality of highlight-side dot centers (731) after being rotated in accordance with the variation in gray level on the highlight side and a halftone dot area (i.e., joined dot areas) should be changed around a plurality of shadow-side dot centers after being rotated in accordance with the variation in gray level on the shadow side. In a halftone dot image generated by using the matrix area which is thus generated, it is possible to suppress moire and graininess.

12 Claims, 9 Drawing Sheets

METHOD OF GENERATING THRESHOLD MATRIX AND RECORDING MEDIUM STORING DATA OF THRESHOLD MATRIX

BACKGROUND OF THE INVENTION

1. Field of the Invention

The present invention relates to a threshold matrix used for generation of a halftone dot image representing a grayscale original image.

2. Description of the Background Art

To create data for printing plate from data of an original image of gray scale (i.e., continuous tone), halftone dots are used in many cases. In a generally-used AM (Amplitude Modulated) screening, grayscale representation is made by changing the size of dots, instead of changing the number of dots constituting a halftone dot image, but since the dots are regularly arranged, when a periodic image is created by using halftone dots, there arises moire in the created halftone dot image. Then, techniques for reducing an effect of moire have been disclosed in, e.g., U.S. Pat. No. 6,128,099 (Document 1) where a plurality of dot centers are arranged randomly and U.S. Pat. No. 5,859,955 (Document 2) where a plurality of highlight-side dot centers and a plurality of shadow-side dot centers are arranged while being stochastically distributed.

On the other hand, in an FM (Frequency Modulated) screening, grayscale representation is made by changing the number of dots of certain size, which are arranged appropriately (in a random fashion without extreme local difference in density).

In general, however, by changing a halftone dot area around the highlight-side dot center in accordance with the variation in gray level on the highlight side of an original image and changing the halftone dot area around the shadow-side dot center in accordance with the variation in gray level on the shadow side thereof, the variation characteristics of halftone dots in accordance with the variation in gray level on the highlight and shadow sides of the original image can be symmetrical to each other and therefore a preferable halftone dot image can be formed.

In the technique of Document 1 where the dot centers are arranged randomly, usually, there is a great variation in the distance between adjacent dot centers and depending on the method of growing the halftone dots, the dots whose dot centers are positioned near are joined quickly and the dots whose dot centers are positioned far are joined slowly, and especially, there arises a variation in joint of the halftone dots representing a concentration of about 50%, and this causes graininess in a printed matter. Also in the technique of Document 2 where a plurality of highlight-side dot centers and a plurality of shadow-side dot centers are arranged, since the regularity that a plurality of shadow-side dot centers are arranged around one highlight-side dot center is lost, there arises remarkable graininess in a created image. In the FM screening, there also arises graininess due to a varied joint of dots.

SUMMARY OF THE INVENTION

The present invention is intended for a method of generating a threshold matrix which is used for generation of a halftone dot image representing a grayscale original image, and it is an object of the present invention to suppress moire and graininess in a halftone dot image generated by using the threshold matrix.

According to the present invention, the method of generating a threshold matrix comprises the steps of arranging a plurality of highlight-side dot centers and a plurality of shadow-side dot centers alternately at regular intervals in predetermined two arrangement directions in a matrix area for storing a threshold matrix, setting reference points as many as or less than a quarter of the number of the plurality of highlight-side dot centers and the plurality of shadow-side dot centers, to be distributed almost uniformly in the matrix area, rotating each dot center included in the plurality of highlight-side dot centers and the plurality of shadow-side dot centers about a nearest reference point, and determining threshold values in the matrix area so that halftone dot areas are changed around the plurality of highlight-side dot centers after being rotated in accordance with variation in gray level on a highlight side and a halftone dot area (i.e., joined dot areas) is changed around the plurality of shadow-side dot centers after being rotated in accordance with variation in gray level on a shadow side.

By the method of the present invention, through rotation of the dot centers about the reference points, it is possible to suppress moire and graininess in the halftone dot image generated by using the threshold matrix.

Preferably, a rotation angle with respect to each dot center becomes smaller as a distance between the nearest reference point and each dot center becomes longer.

Normally, the total number of the plurality of highlight-side dot centers and the plurality of shadow-side dot centers is not smaller than twenty times and not larger than four hundreds times the number of the reference points.

To suppress graininess in the generated halftone dot image, it is preferable that after rotation of the dot centers, the uniformity in distribution of the plurality of highlight-side dot centers and the plurality of shadow-side dot centers should be improved.

According to an aspect of the present invention, in the method of generating a threshold matrix, the two arrangement directions of the dot centers are orthogonal to each other and the arrangement pitches of the dot centers in the two arrangement directions are equal to each other.

According to another aspect of the present invention, in the method of generating a threshold matrix, immediately after arranging the dot centers, a quadrangle having vertices of four shadow-side dot centers adjacent to one highlight-side dot center is a rectangle having longer sides, and after rotating the dot centers about the reference point, the threshold values are determined so that each boundary of a halftone dot area(s) has a shape which is longer in the longitudinal direction of the rectangle.

By the method of these aspects of the present invention, it is possible to generate a threshold matrix which allows generation of halftone dots having directivity.

The present invention is also intended for a computer-readable recording medium in which data of a threshold matrix is recorded.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
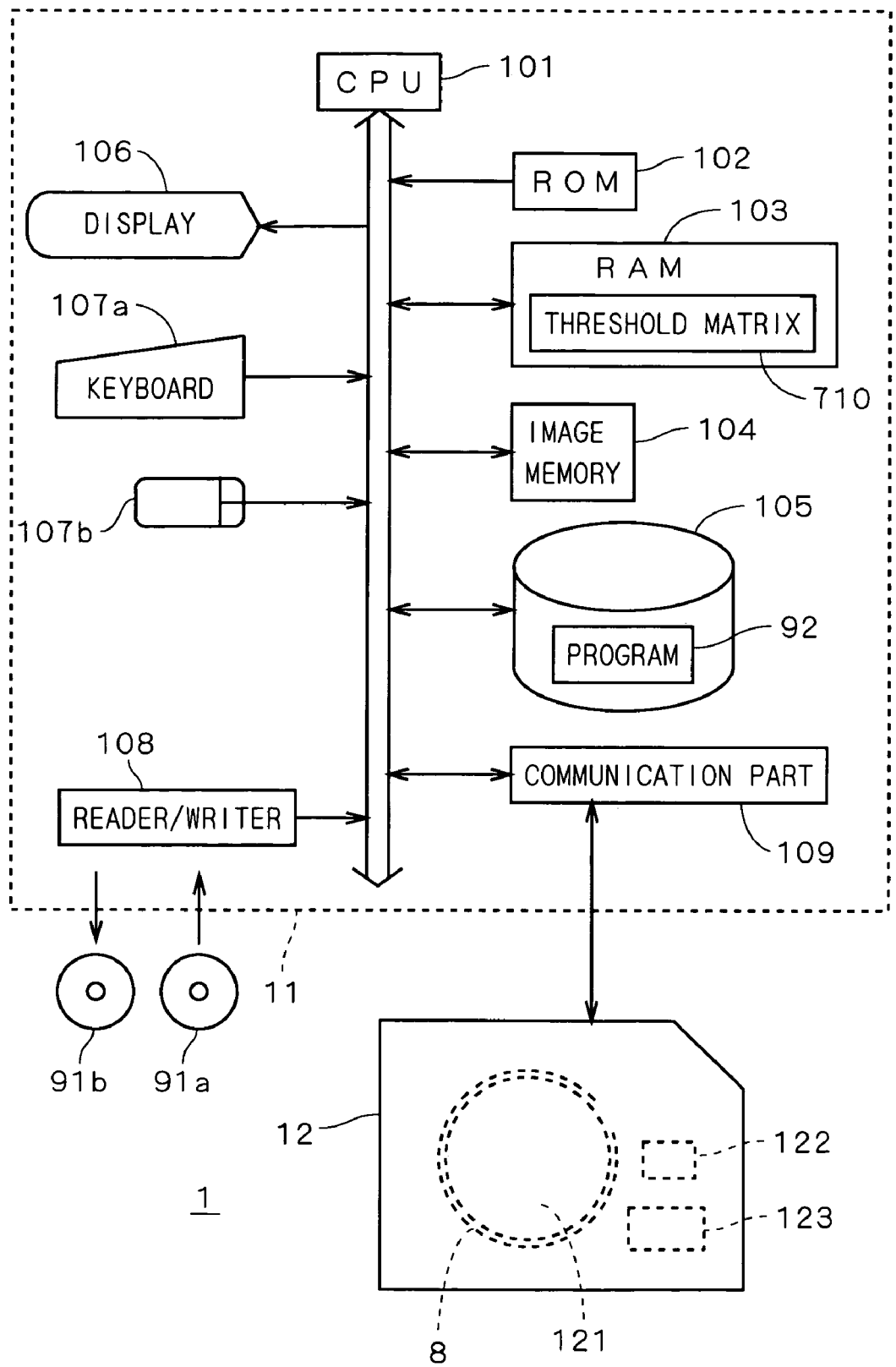
FIG. 1 is a view showing a construction of an image recording system.

FIG. 1 is a view showing a construction of an image recording system 1 in accordance with one preferred embodiment of the present invention. The image recording system 1 comprises a computer 11 and an image recording apparatus 12, and the image recording apparatus 12 receives a signal from the computer 11 and records halftone dots on a printing plate 8 serving as a halftone dot recording medium by using light beams from a multichannel laser or the like. The image recording apparatus 12 may be a printing apparatus of another recording mode such as an electrophotographic or ink-jet printing apparatus using a photosensitive drum or printing paper, respectively, as the halftone dot recording medium.

The computer 11 has a constitution of general computer system where a CPU 101 for performing various computations, a ROM 102 for storing a basic program and a RAM 103 for storing various information are connected to a bus line. To the bus line, an image memory 104 for storing data of a grayscale image (hereinafter, referred to as "original image") to be represented by halftone dots (screening), a fixed disk 105 for storing information, a display 106 for displaying various information, a keyboard 107a and a mouse 107b for receiving an input from an operator, a reader/writer 108 for reading information from a computer-readable recording medium 91a such as an optical disk, a magnetic disk or a magneto-optic disk and writing information into the recording medium 91b, and a communication part 109 for making communications with the image recording apparatus 12 are further connected through interfaces (I/F) as appropriate.

The image recording apparatus 12 comprises a drum 121 holding a printing plate 8 on its side surface, a writing head 122 for outputting light beams which are modulated in multichannel towards the printing plate 8, a signal generation circuit 123 for generating a signal of halftone dot image to be transmitted to the writing head 122, a driving mechanism for scanning the writing head 122 with respect to the printing plate 8 by rotating the drum 121 and moving the writing head 122 along a rotation axis of the drum 121, and the like. In the following discussion, "pixel" refers to one unit for recording (writing) in the image recording apparatus 12 and corresponds to one spot by one light beam.

In the computer 11, a program 92 is read out from the recording medium 91a through the reader/writer 108 in advance and stored in the fixed disk 105. Then, the program 92 is copied in the RAM 103 and the CPU 101 performs a computation according to the program 92 in the RAM 103 (that is, the computer 11 executes the program), by which the computer 11 generates a threshold matrix (SPM (Screen Pattern Memory) data) 710 to be used for formation of halftone dots, which is discussed later. The threshold matrix 710 and the data of the grayscale original image stored in the image memory 104 are transmitted to the image recording apparatus 12 through the communication part 109, the signal generation circuit 123 in the image recording apparatus 12 generates signals of halftone dots used to represent the original image and the halftone dots are recorded on the printing plate 8 on the basis of the halftone signals while the writing head 122 is scanned with respect to the printing plate 8.

In the image recording system 1 for generating a halftone dot image, recording the halftone dots on the printing plate 8 may be regarded as (physical) formation of the halftone dot image, and generation of the signals for the halftone dots may be regarded as (nonphysical) formation of the halftone dot image. The generation of the signals for the halftone dots may be performed by software with the computer 11 and in this case, the computer 11 is an apparatus which solely forms the halftone dot image on the basis of the original image.

Figure 2:
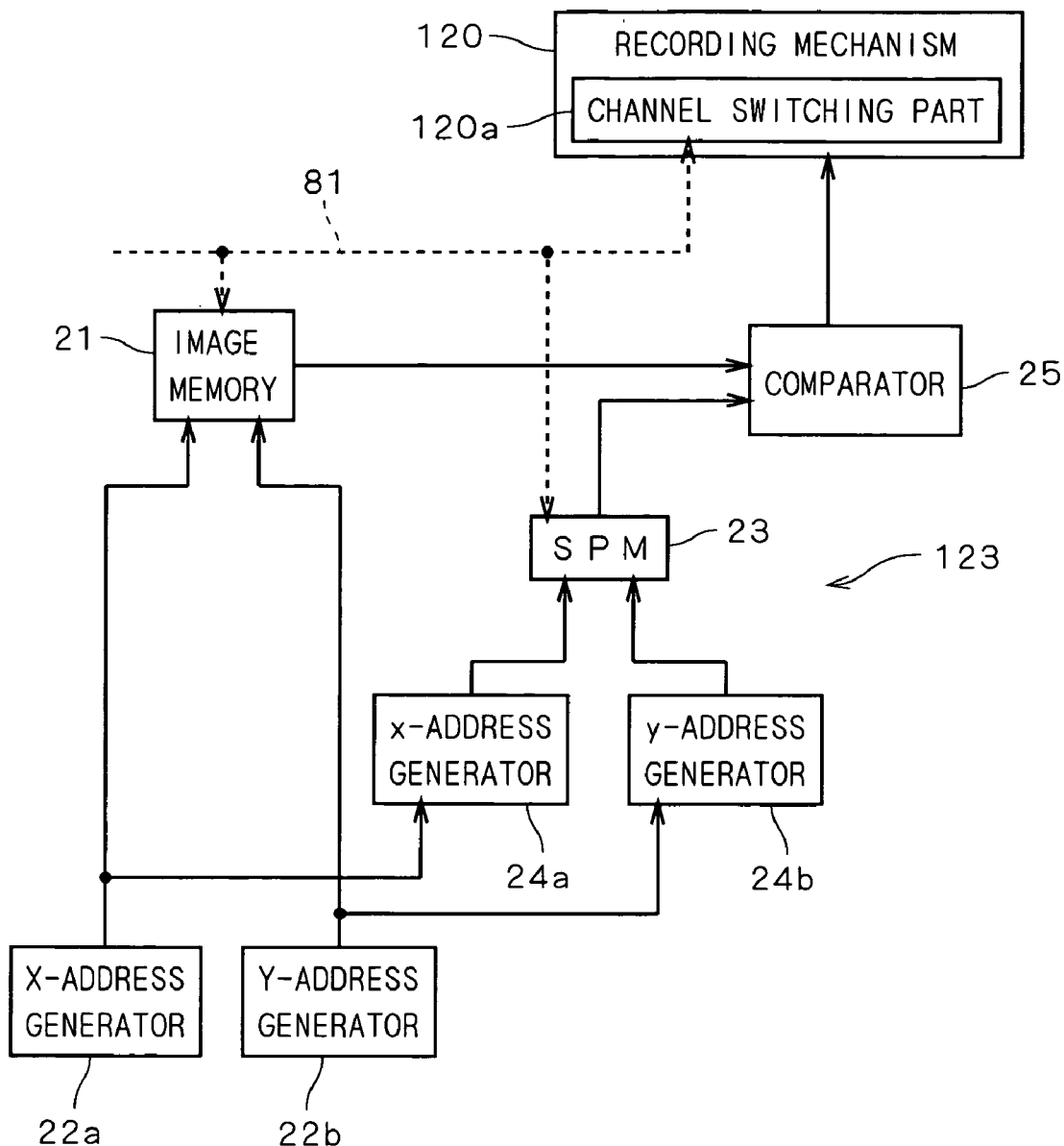
FIG. 2 is a block diagram showing a signal generation circuit and a recording mechanism.

FIG. 2 is a block diagram showing constituent elements of the signal generation circuit 123 in the image recording apparatus 12 and a recording mechanism 120. The recording mechanism 120 corresponds to the drum 121, the writing head 122, a mechanism for driving these elements, a circuit for controlling these elements or the like.

The signal generation circuit 123 comprises an image memory 21 for storing data of the grayscale original image, an X-address generator 22a and a Y-address generator 22b for generating a subscan address (X address) and a main scan address (Y address) in the original image, respectively, an SPM (Screen Pattern Memory) 23 for storing the threshold matrix 710 generated by the computer 11, an x-address generator 24a and a y-address generator 24b for generating a subscan address (x address) and a main scan address (y address) in the threshold matrix 710, respectively, and a comparator 25.

Figure 3:
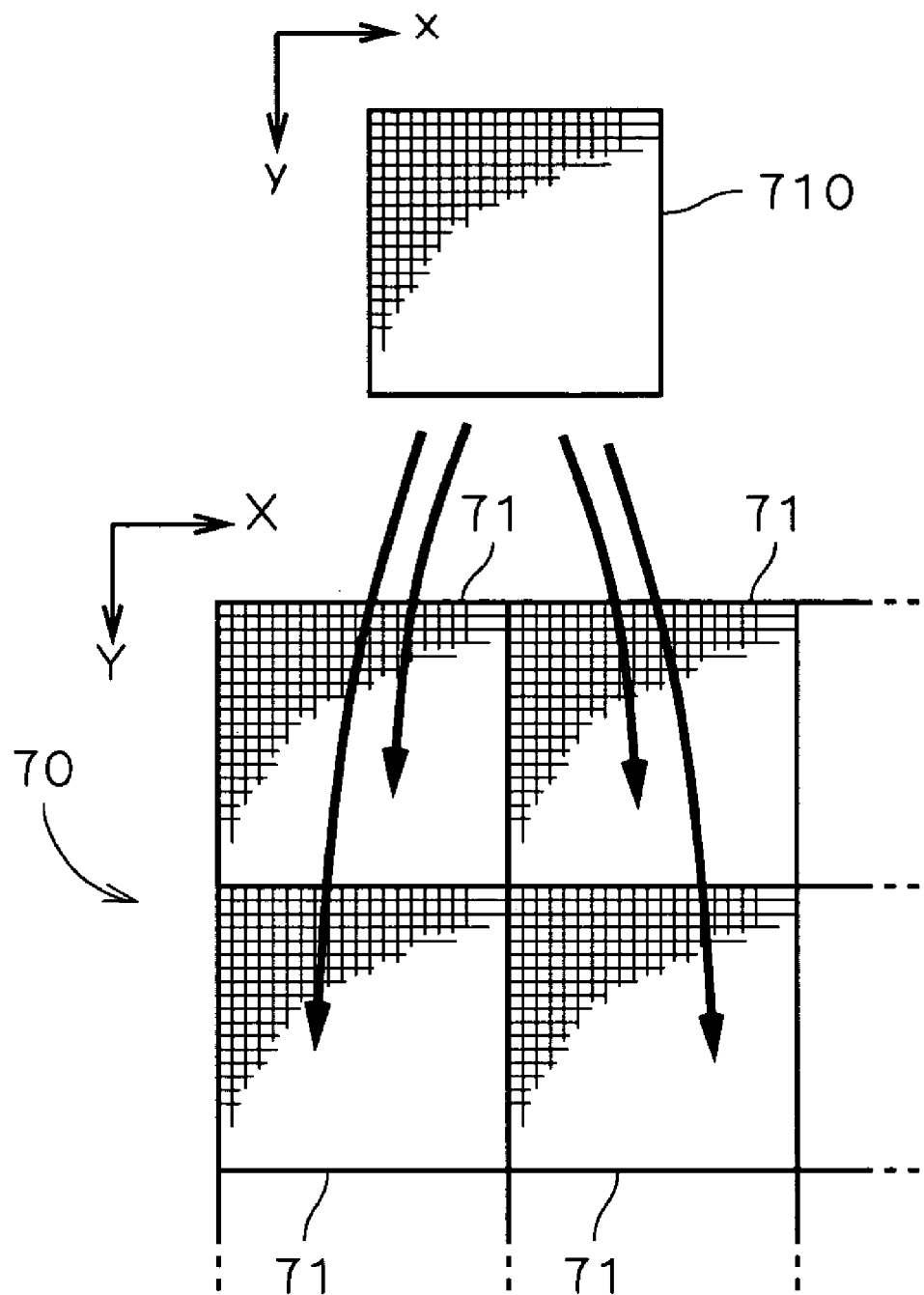
FIG. 3 is a view showing repeat areas and a threshold matrix.

In creating halftone dots of the original image, as shown in FIG. 3, the original image 70 is divided into a lot of areas having the same size to set repeat areas 71 each serving as a unit for creation of halftone dots. The SPM 23 has a storage area corresponding to one repeat area 71, and sets a threshold value for each address (coordinates) of the storage area to store the threshold matrix 710. Then, conceptually, each repeat area 71 of the original image 70 and the threshold matrix 710 are superposed and the gray level of each pixel in the repeat area 71 is compared with a corresponding threshold value in the threshold matrix 710, to thereby determine whether writing should be performed on the position of the pixel on the halftone dot recording medium or not. Therefore, if the gray level of the original image 70 is uniform, writing is performed on a pixel having an address where a threshold value smaller than the gray level is set in the threshold matrix 710 and macroscopically, uniform halftone dots are generated. Actually, since the original image 70 has gradation (i.e., portions having various gray levels), the halftone dots vary in the repeat area 71 in accordance with the gradation in the original image 70.

Specific discussion will be made on creation of halftone dots, referring to FIG. 2. The gray level of one pixel in the original image is read out from the image memory 21 on the basis of an X address and a Y address from the X-address generator 22a and the Y-address generator 22b, respectively. On the other hand, an x address and a y address in the repeat area corresponding to the X address and the Y address in the original image are obtained by the x-address generator 24a and the y-address generator 24b, respectively, and one threshold value in the threshold matrix 710 is thereby specified and read out from the SPM 23. The comparator 25 compares the gray level from the image memory 21 with the threshold value from the SPM 23, and when the gray level is larger than the threshold value, a signal to indicate that writing should be performed on the position of the pixel is generated.

If the original image is a multicolor image, a color component specifying signal 81 is inputted to the image memory 21, the SPM 23 and the channel switching part 120a of the recording mechanism 120 and the operation of the recording mechanism 120 in this case will be discussed later.

Figure 4:
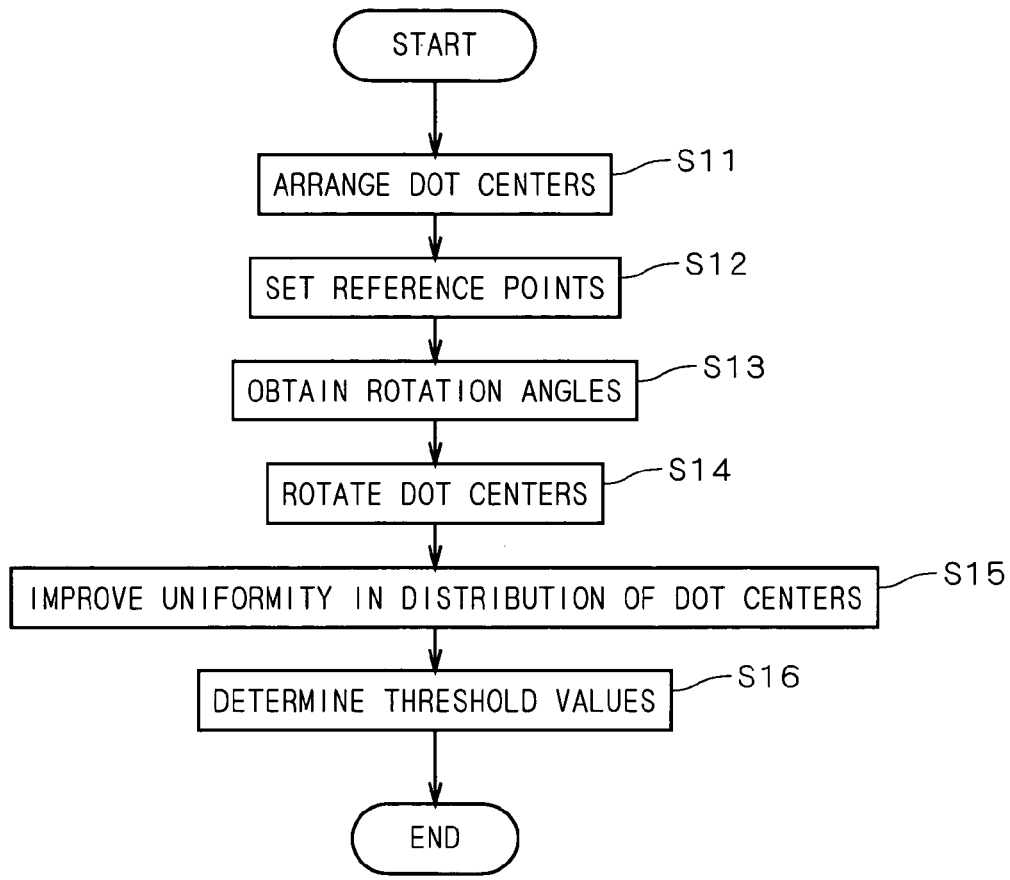
FIG. 4 is a flowchart showing an operation flow for generating the threshold matrix.

Next, discussion will be made on an operation of the image recording system 1 for generating a halftone dot image representing a grayscale original image. In generation of the halftone dot image by the image recording system 1, first, the computer 11 generates the threshold matrix 710 used for generation of the halftone dot image. FIG. 4 is a flowchart showing an operation flow of the computer 11 for generating the threshold matrix 710.

In generation of the threshold matrix 710, first, the computer 11 sets a matrix area for storing the threshold matrix 710 and centers of halftone cells (each of which corresponds to the almost central position of a dot (halftone dot area) used to represent the halftone dot image and hereinafter referred to as "dot center") are regularly arranged (Step S11). Each halftone cell serves as a unit of an area for forming the halftone dot. In the case of this preferred embodiment, highlight-side dot cells in each of which a dot is changed in response to variation in gray level on the highlight side of the original image and shadow-side dot cells in each of which a halftone dot area is changed in response to variation in gray level on the shadow side are provided, and as shown in FIG. 5, a plurality of highlight-side dot centers 731 and a plurality of shadow-side dot centers 741 are regularly arranged in the matrix area 720.

Figure 5:
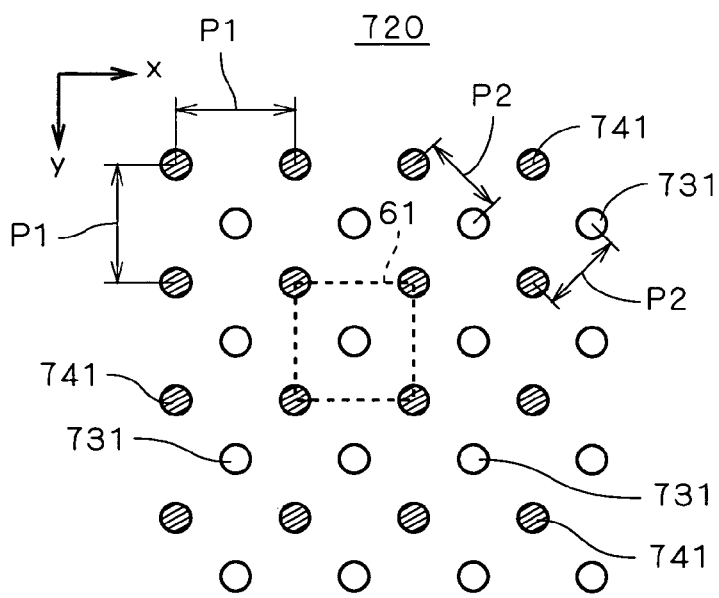
FIG. 5 is a view showing dot centers arranged in a matrix area.

As shown in FIG. 5, in the matrix area 720 defined in the x direction and the y direction, a plurality of shadow-side dot centers 741 are arranged along the x direction and the y direction at a pitch P1 and one highlight-side dot center 731 is placed at the center of a quadrangle (square) 61 formed of four adjacent shadow-side dot centers 741 serving as vertices, having a minimum area. A plurality of highlight-side dot centers 731 are thereby arranged at the pitch P1 in the x and y directions. The above arrangement is equivalent to an arrangement in which a plurality of highlight-side dot centers 731 and a plurality of shadow-side dot centers 741 are placed in the matrix area 720 alternately at regular intervals along two arrangement directions orthogonal to each other, which are inclined at an angle of 45 degrees clockwise and counterclockwise with respect to the x direction (or the y direction), respectively, and the respective arrangement pitches P2 of the dot centers 731 and 741 in the two arrangement directions are equal to each other. The direction in which the dot centers 731 and 741 are arranged at the pitch P1 is not limited to the x direction or the y direction but may be a direction inclined with respect to either one of these directions.

In the matrix area 720 of FIG. 5, assuming that one dot almost around each highlight-side dot center 731 for representing the highlight (a dot formed in one quadrangle 61 in the arrangement of FIG. 5, and such a dot is hereinafter referred to as "halftone dot") is formed, if the screen ruling (halftone dot density) is 300 and the halftone dots are recorded by the image recording apparatus 12 having a resolution of 2400 dpi (the width of one pixel is about 10 μm) and the matrix area 720 has a size of 400×400 pixels, an area allocated to one halftone dot (i.e., the area of the quadrangle 61) has about 64 (8×8) pixels and 250 halftone dots are included in the matrix area 720. In other words, the matrix area 720 includes 2500 highlight-side dot centers 731 and 2500 shadow-side dot centers 741. In this case, in the matrix area 720 of FIG. 5, the pitch P1 is 8 pixels and the pitch P2 is (8/sqrt (2)) pixels (where sqrt (2) represents the square root of 2).

Subsequently, a plurality of reference points 751 used for a later-discussed process are placed and set in the matrix area 720 (Step S12). In setting of the reference points, first, an evaluation value is associated with each of all the positions in the matrix area 720 (all the positions which can be specified with coordinate values) and all the evaluation values are initialized to be zero. The first reference point is randomly placed within the matrix area 720 and the reciprocal of the square of the distance between each position and the first reference point is added to the evaluation value corresponding to the position. At this time, since the matrix area 720 corresponds to the repeat area 71 shown in FIG. 3, the first reference point which is an object for calculation of the evaluation value is thought to be repeated both in the horizontal and vertical directions. In other words, in calculation of the evaluation value selected is one out of a plurality of first reference points when the matrix area 720 is assumed to repeat, which is closest to a position used as a distance calculation reference.

After the evaluation values for all the positions are obtained, a second reference point is placed at a position associated with the smallest one of the evaluation values. In other words, the second reference point is placed at the position farthest from the first reference point. Next, the reciprocal of the square of the distance between each position and the second reference point (the closest one out of a plurality of second reference points when the matrix area 720 is assumed to repeat) is added to the corresponding evaluation value. Then, a third reference point is placed at a position associated with the smallest evaluation value. If there are a plurality of positions to become a location candidate for the reference point, however, one of them is appropriately selected.

Figure 6:
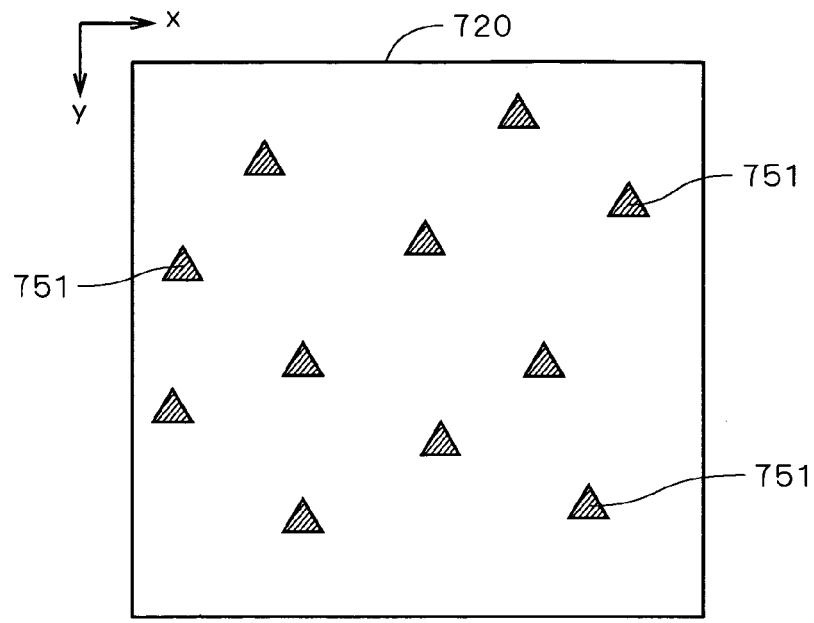
FIG. 6 is a view showing reference points set in the matrix area.

After that, the reciprocal of the square of the distance between each position in the matrix area 720 and the last-placed reference point (assuming that the matrix area 720 is repeated) is added to the corresponding evaluation value, and the next reference point is placed at a position associated with the smallest evaluation value. With this operation, the next reference point is placed at a position farthest from any one of the reference points, and a plurality of reference points 751 are arranged in the matrix area 720 almost uniformly in a random fashion, as shown in FIG. 6. In the case where 2500 highlight-side dot centers 731 and 2500 shadow-side dot centers 741 are included in the matrix area 720, as discussed above, 25 reference points 751, for example, are set in the matrix area 720. It is preferable, practically, that the total number of a plurality of highlight-side dot centers 731 and a plurality of shadow-side dot centers 741 should not be smaller than 20 times the number of reference points 751 and not be larger than 400 times.

The setting of the reference points 751 may be performed by other methods only if the reference points 751 can be arranged almost uniformly. For example, in the above method, a plurality of reference points 751 may be arranged first in a random fashion. There may be a case where the positions associated with the evaluation values are limited to the positions of the highlight-side dot centers 731 or (and) the shadow-side dot centers 741, to reduce the amount of computation in Step S12. As another setting of the reference points 751, the reference points 751 which are arranged in a random fashion may be rearranged almost uniformly by utilizing a solution of facility location problem using Voronoi diagrams. The above computation for distributing and setting a plurality of reference points does not necessarily have to be performed every time when the threshold matrix 710 is generated, and for example, if the arrangement of the reference points which is acquired in generation of another threshold matrix can be used, a plurality of reference points may be set in the matrix area 720 by using this arrangement in Step S12.

Figure 7:
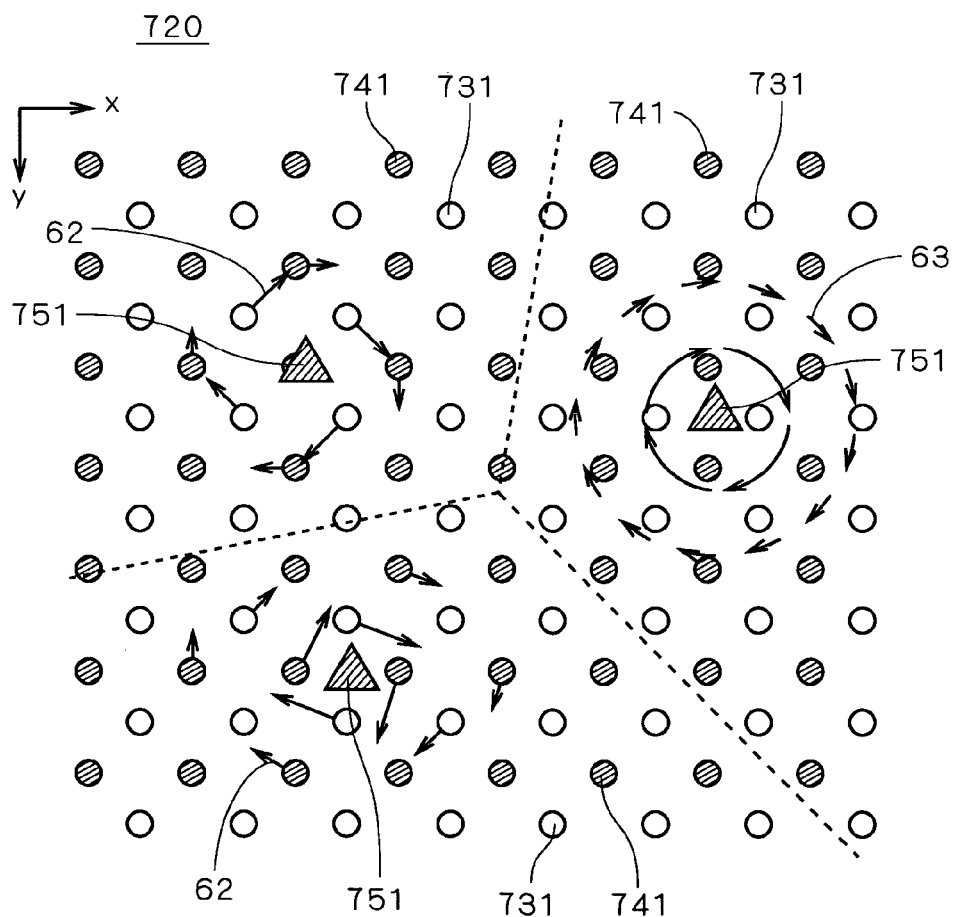
FIG. 7 is a view showing a state where the reference points are superimposed on the dot centers arranged in the matrix area.

When the setting of a plurality of reference points 751 in the matrix area 720 is completed, the nearest reference point 751 is specified for each dot center included in a plurality of highlight-side dot centers 731 and a plurality of shadow-side dot centers 741 in consideration of repeat of the matrix area 720. FIG. 7 is a view showing a state where a plurality of reference points 751 are superimposed on a plurality of highlight-side dot centers 731 and a plurality of shadow-side dot centers 741 arranged in the matrix area 720. In FIG. 7, with respect to the dot centers 731 and 741 included in each of areas which are partitioned by broken lines, the reference point 751 included in the same area is specified as the nearest one, and each area may be thought as a territory of the reference point 751 included in the area.

Subsequently, the computer 11 calculates the distance between each of the dot centers 731 and 741 and the nearest reference point 751 (in consideration of repeat of the matrix area 720). Then, a rotation angle "Degree" with respect to each of the dot centers 731 and 741 is obtained by the calculation of Eq. 1 (Step S13). In Eq. 1, "MaxDegree" is a constant, "distance" represents the distance between each dot center 731 or 741 and the nearest reference point 751 and "offset" is a constant. "SpmSize" represents the length of the matrix area 720 in the x direction or the y direction, n represents the number of reference points 751 set in the matrix area 720 and D represents the average length of an area in the x direction or the y direction on which one reference point 751 has an effect (in other words, an area including only the dot centers 731 and 741 for which this reference point 751 serves as the nearest reference point 751). Further, "sqrt (n)" represents the square root of n.

Degree=MaxDegree·(1−distance/($D$/2))+offset    Eq. 1 where D=SpmSize/sqrt(n)

Though "MaxDegree" and "offset" are actually values common to all the reference points 751 in Eq. 1, for example, the value of "offset" may be changed for each reference point 751. If the first term on the right side of Eq. 1 takes a negative value, the rotation angle Degree is calculated assuming that the value of the firs term is zero.

After the rotation angle Degree with respect to each of the dot centers 731 and 741 is obtained, the dot centers 731 and 741 are rotated about the nearest reference point 751 in the same rotation direction (Step S14). At this time, from Eq. 1, the rotation angle with respect to each of the dot centers 731 and 741 becomes smaller as the distance "distance" between the dot center 731 or 741 and the nearest reference point 751 becomes longer. In the upper left and lower left areas of FIG. 7, shorter arrows 62 which are farther from the reference point 751 indicate that the rotation angle with respect to each of the dot centers 731 and 741 becomes smaller as the distance between the dot center and the nearest reference point 751 becomes longer. In the upper right area, arrows 63 conceptually indicate that the rotation angle of each dot center becomes smaller as the distance between the dot center and the reference point 751 becomes longer. The rotation angle with respect to each of the dot centers 731 and 741 may be determined on the basis of an equation other than Eq. 1 only if the rotation angle becomes smaller as the distance between the dot center and the nearest reference point 751 becomes longer, and the rotation direction of each of the dot centers 731 and 741 may be changed in accordance with the nearest reference point 751.

Figure 8:
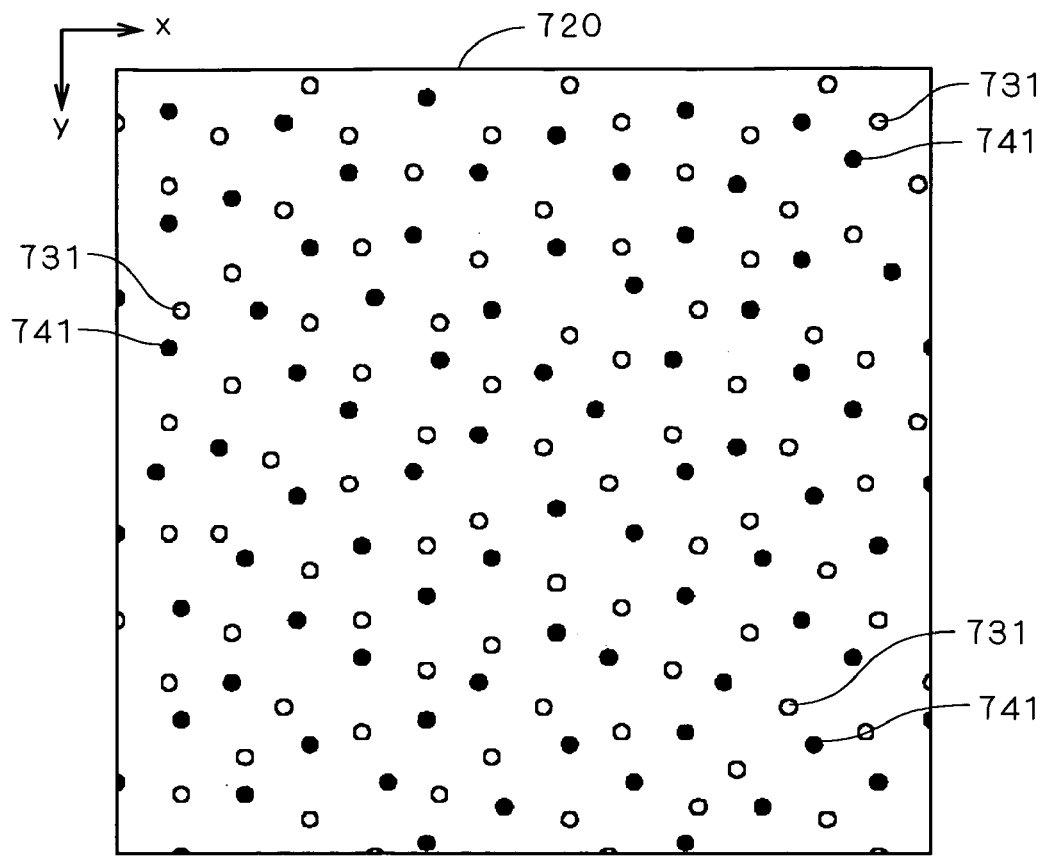
FIG. 8 is a view showing the dot centers after being rotated.

FIG. 8 is a view showing a plurality of highlight-side dot centers 731 and a plurality of shadow-side dot centers 741 after being rotated. In the highlight-side dot centers 731 and the shadow-side dot centers 741 after rotation, the regularity in arrangement in which the dot centers are arranged along the two arrangement directions (or the x direction and the y direction) is lost (fluctuation is given to the arrangement). On the other hand, at least among the dot centers 731 and 741 for which the same reference point 751 serves as the nearest one, the positional relation where a plurality of shadow-side dot centers 741 are positioned around one highlight-side dot center 731 (or a plurality of highlight-side dot centers 731 are positioned around one shadow-side dot center 741) is almost maintained.

Subsequently, uniformity in distribution of a plurality of highlight-side dot centers 731 and a plurality of shadow-side dot centers 741 in the matrix area 720 is improved (Step S15). As a method for improving uniformity in distribution of the dot centers 731 and 741, for example, the solution of facility location problem using Voronoi diagrams can be used. The facility location problem is a nonlinear optimization problem for determining location of a plurality of facilities in a two-dimensional space so that the total of expenditures to be used by a lot of users who are present in the two-dimensional space to utilize the facilities should become a minimum value. In this case, the evaluation function used to obtain the "expenditures" is, e.g., a distance between a user and each facility. The Voronoi diagram is described in detail in "separate volume of "bit", Computational Geometry and Geographic Information Technology", supervised by Masao Iri, published by Kyoritsu Shuppan Co., Ltd., Sep. 10, 1986, pp. 163 to 168, and the disclosure of which is herein incorporated by reference.

Figure 9:
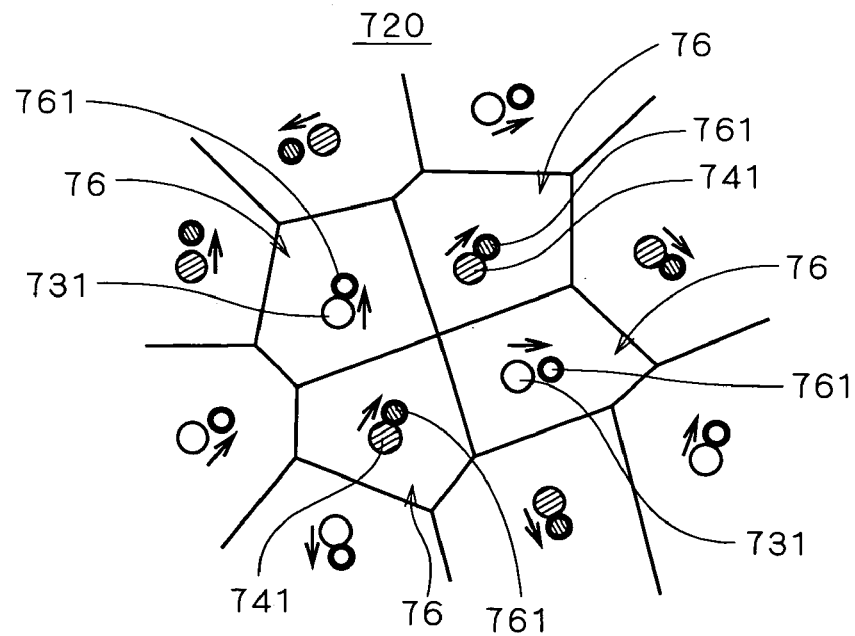
FIG. 9 is a view illustrating a manner of improving the uniformity in distribution of the dot centers.

Specifically, a perpendicular bisector of line segment connecting any one dot center 731 or 741 and its neighboring dot center 731 or 741 is obtained, and by connecting intersection points of the perpendicular bisectors, a Voronoi polygon 76 is formed as shown in FIG. 9. Then, as indicated by a circle having a size different from that of the dot centers 731 and 741 in FIG. 9, a barycenter 761 of the Voronoi polygon 76 is obtained, and each dot center 731 or 741 is moved to the position of the barycenter 761. The uniformity in distribution of the dot centers 731 and 741 in the matrix area 720 is thereby improved. There may be a case where the formation of the Voronoi polygon 76, the calculation of the barycenter 761 and the movement of the dot centers 731 and 741 are repeated on the dot centers 731 and 741 after being moved as necessary, to further improve the uniformity in distribution. The operation for improving the uniformity in distribution of the dot centers 731 and 741 may be performed by a method other than the above.

After the dot centers 731 and 741 which are distributed almost uniformly are set, a threshold value is determined for the matrix area 720 (Step S16). In determining the threshold value, first, a halftone cell serving as a unit for creation of halftone dot is set around each of the dot centers 731 and 741.

Figure 10:
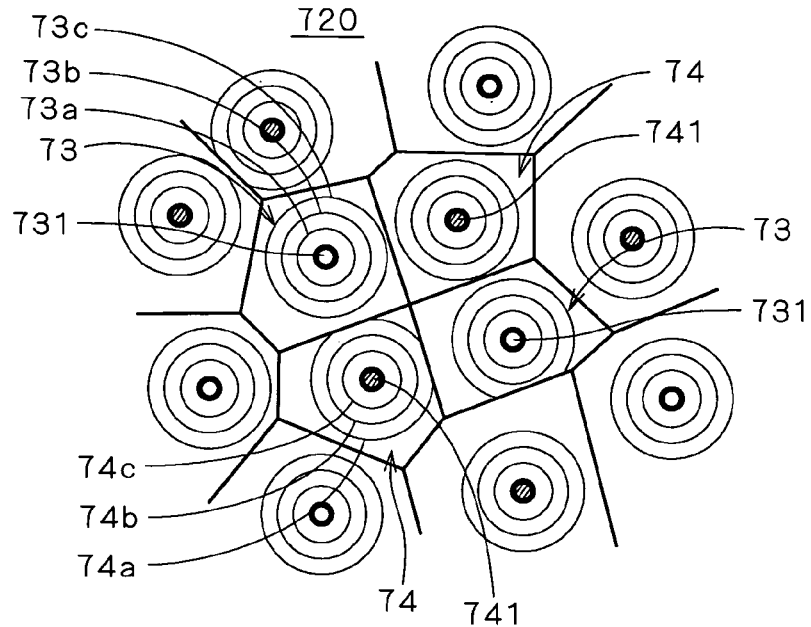
FIG. 10 is a view showing a state where halftone cells are set.

FIG. 10 is a view showing a state where polygonal halftone cells 73 and 74 are set around the dot centers 731 and 741, respectively, and a highlight-side halftone cell 73 corresponds to the highlight-side dot center 731 and a shadow-side halftone cell 74 corresponds to the shadow-side dot center 741. The halftone cells 73 and 74 are set in the matrix area 720 in consideration of repeat of the matrix area 720 both in the horizontal and vertical directions.

The setting of the halftone cells is performed, for example, in the following manner. First, in order to determine which one of the dot centers 731 and 741 a pixel at a position in the matrix area 720 belongs to, the square of the distance between the pixel and each of the dot centers 731 and 741 is obtained as an evaluation value. In calculation of the evaluation value for one dot center 731 or 741 (hereinafter, referred to as "specified dot center"), one out of a plurality of specified dot centers in consideration of repeat of the matrix area 720 both in the horizontal and vertical directions, which is closest to the specified pixel, is selected as an object for calculation of the evaluation value. Then, it is determined that this pixel should belong to the dot center 731 or 741 which has the smallest evaluation value. By performing the above calculation for all the pixels, the matrix area 720 is divided into halftone cells 73 and 74 around the dot centers 731 and 741.

When the setting of the halftone cells 73 and 74 is completed, subsequently, a first-stage evaluation value is obtained for each of all the pixels in each of the halftone cells 73 and 74. As the first-stage evaluation value, for example, used is the distance between the pixel and the dot center 731 or 741 of the halftone cell 73 or 74 including the pixel. Then, numbers of integer which increase by 1 are sequentially assigned to all the pixels in each halftone cell 73 or 74, from one having the smallest first-stage evaluation value, and the number is divided by the number of pixels constituting the halftone cell 73 or 74, to obtain a second-stage evaluation value (ranging from 0.0 to 1.0) which is normalized by the size of the halftone cell, which is now assigned. This allows a smaller evaluation value to be assigned to a pixel closer to the dot center 731 or 741. The first-stage evaluation value may be obtained by relocating the dot center 731 or 741 to a representative point of the halftone cell 73 or 74 (e.g., a barycenter or the like).

Next, with respect to each of the shadow-side halftone cells 74, the second-stage evaluation value is changed to a value obtained by subtracting the second-stage evaluation value from 2. This gives evaluation values each ranging from 2.0 to 1.0 to the pixels of the shadow-side halftone cells 74, and the second-stage evaluation value becomes larger as the pixel is closer to the shadow-side cell center 741. Then, numbers of integer which increase by 1 (the order of pixels for writing in accordance with an increase in gray level of the original image, i.e., a lighting order in exposure) are sequentially assigned all the pixels in the matrix area 720, from one having the smallest second-stage evaluation value, and reduction of gray levels is performed in accordance with the number of gray levels in screening (equal to the number of gray levels in the original image in this preferred embodiment) and the final threshold value is thereby assigned to each pixel, to generate the threshold matrix 710 corresponding to the matrix area 720 (see FIG. 1).

When the number of pixels in the matrix area 720 is M and the number of gray levels in the original image is N (typically, 256 (=8 bit)), for example, the number (0 to (M−1)) assigned to each pixel is multiplied by ((N−1)/(M−1)), to assign the threshold value ranging from 0 to (N−1) to the pixel.

When generation of the threshold matrix 710 is completed by the computer 11, the threshold matrix 710 and the data of the original image stored in the image memory 104 are transmitted to the image recording apparatus 12 through the communication part 109 and stored into the SPM 23 and the image memory 21 shown in FIG. 2, respectively, as discussed earlier. With this operation, a group of threshold values corresponding to the growth of the halftone dots of halftone cells 73 are set in a storage area having the same size as the matrix area 720 in the SPM 23. Then, the gray level of each pixel in the original image stored in the image memory 21 and the corresponding threshold value in the threshold matrix 710 in the SPM 23 are inputted to the comparator 25, the signal generation circuit 123 in the image recording apparatus 12 generates a signal of halftone dot image and the writing head 122 records the halftone dot image. Specifically, when the gray level of the pixel in the original image is larger than the threshold value, light is emitted to a position of the printing plate 8 corresponding to the pixel by the recording mechanism 120, to thereby perform writing.

In the threshold matrix 710 obtained in the operation of FIG. 4, threshold values which are half or less than the maximum gray level are given to the positions of the pixels in the highlight-side halftone cells 73 and threshold values which are half or more than the maximum gray level are given to the positions of the pixels in the shadow-side halftone cells 74. Then, the threshold value becomes local minimum at the highlight-side dot centers 731 and the threshold value becomes local maximum at the shadow-side dot centers 741. As a result, when the gray level of the original image increases from 0% to 50%, the dot (halftone dot area) grows (or inflates) from the highlight-side dot center 731 in the highlight-side halftone cell 73 and when the gray level increases from 50% to 100%, the halftone dot area grows from the peripheral portion of the shadow-side halftone cell 74 towards the shadow-side dot center 741 (the blank dots are deflated (or eroded) towards the shadow-side dot centers 741). Thus, with the gray level of 50% in the original image as a border, the variation of halftone dot area in the highlight-side halftone cell and the variation of halftone dot area in the shadow-side halftone cell in response to the variation in gray level are switched, and this allows the variation characteristic of the halftone dots in accordance with the variation in gray level of the original image to be almost symmetric on the highlight side and the shadow side and preferable halftone dots can be thereby formed.

FIG. 10 also illustrates the change in size of the dot (a set of pixels to which writing is performed) to be written in the halftone cell 73 or 74 in accordance with variation in gray level of the original image, and lines 73a to 73c represent boundaries of dot which grows in accordance with the increase in the gray level of the original image on the highlight side and lines 74a to 74c represent boundaries of halftone dot area which grows (the blank dot which degenerates) in accordance with the increase in the gray level on the shadow side. In FIG. 10, since the first-stage evaluation value for each pixel is obtained as the distance between the pixel and the dot center 731 or 741, as indicated by the lines 73a to 73c and 74a to 74c, the boundary of the halftone dot area has a (perfect) circular shape and the dot grows or deflates isotropically.

Figure 11A:
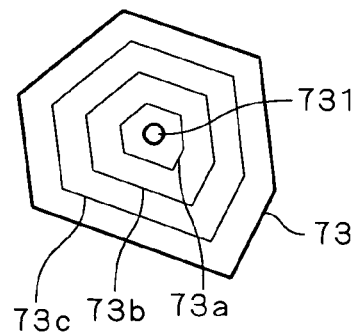
FIG. 11A is a view showing an example of change in size of a dot.
Figure 11B:
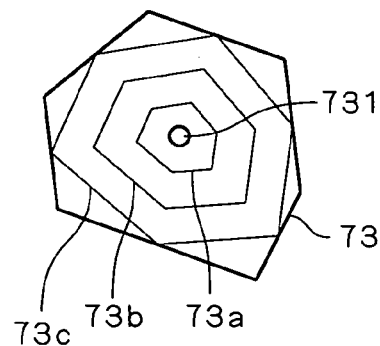
FIG. 11B is a view showing another example of change in size of a dot.

FIGS. 11A and 11B are views showing other exemplary growths of the dot, and the same reference signs as those in FIG. 10 are used (only the dot on the highlight side is shown). In FIG. 11A, as the first evaluation value used is a ratio between the distance from the dot center 731 to the pixel which is an object for calculation of the first evaluation value and the distance from the dot center 731 to an edge of the halftone cell 73 (or the halftone cell 74) on a line connecting the dot center 731 (or the dot center 741) and the pixel. In FIG. 11B, an inside polygon formed by connecting midpoints of sides of a polygonal halftone cell is set, and as the first evaluation value used is a ratio between the distance from the dot center 731 to the pixel and the distance from the dot center 731 to an edge of the inside polygon on a line connecting the dot center 731 and the pixel. In FIG. 11B, in areas between the inside polygon and the edge of the halftone cell 73, the first evaluation values which increase towards vertices of the halftone cell 73 are appropriately set. Thus, in Step S16 of FIG. 4, various methods may be adopted only if the threshold values are determined so that the halftone dot areas should be changed almost around a plurality of highlight-side dot centers 731 after being rotated in accordance with the variation in gray level on the highlight side of the original image and the halftone dot area (i.e., joined dot areas) should be changed almost around a plurality of shadow-side dot centers 741 after being rotated in accordance with the variation in gray level on the shadow side.

Figure 12:
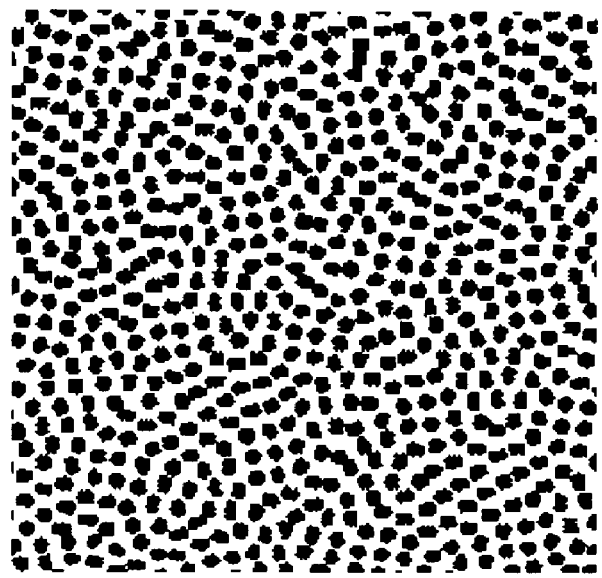
FIG. 12 is a view showing a halftone dot image.

FIG. 12 is a view showing an example of halftone dot image formed in the image recording system 1, and this is the halftone dot image formed when the original image has a uniform gray level. In the halftone dot image shown in FIG. 12, variation in density of adjacent halftone dots is suppressed though the regularity in arrangement of the halftone dots is lost. This shows that it is possible to suppress moire and graininess in the halftone dot image generated by using the threshold matrix 710.

In the above generation process of the threshold matrix, out of a plurality of highlight-side dot centers 731 and a plurality of shadow-side dot centers 741 which are regularly arranged in the matrix area 720, adjacent dot centers 731 and 741 are rotated about the same reference point 751 and therefore the dot centers 731 and 741 are arranged almost uniformly in a random fashion on the whole while maintaining the regularity in positional relation of these dot centers 731 and 741. From the viewpoint of maintaining the regularity in positional relation of the adjacent dot centers 731 and 741, the average number of dot centers 731 and 741 which are rotated about the same reference point 751 is four or more. In other words, in Step S12, the number of reference points 751 to be set should be a quarter of the number of highlight-side dot centers 731 and shadow-side dot centers 741 or less. As discussed earlier, to appropriately ensure the regularity in positional relation and the randomness in arrangement, the number of reference points 751 to be set should not be smaller than 1/400 the number of highlight-side dot centers 731 and shadow-side dot centers 741 and not be larger than 1/20.

There may be a case where data of the generated threshold matrix 710 is written into a recording medium 91b by the reader/writer 108 of the computer 11, the recording medium 91b is carried to other places and a computer in some other image recording system reads the data stored in the recording medium 91b, to generate a halftone dot image. Further, the recording medium 91b storing the data of the threshold matrix 710 may be distributed and this allows generation of a halftone dot image with less moire and graininess by using a general-purpose computer in various places.

If the original image is a grayscale color image, the original image is stored in the image memory 21 for each color component and the threshold matrix is stored in the SPM 23 for each color component. Then, as shown in FIG. 2, the color component specifying signal 81 is inputted to the image memory 21, the SPM 23 and a channel switching part 120a of the recording mechanism 120, and in response to switching of the color component specifying signal 81, the halftone dot image of each color component (color separation) is recorded in a halftone dot recording medium.

A different threshold matrix is prepared for each color component. For example, by shifting the positions of the dot centers 731 and 741 which are originally arranged in a regular form or changing the positions of the reference points which are originally set, the arrangement of the dot centers 731 and 741 after rotation in the threshold matrix is made different for each color component and the shapes of the halftone cells in the threshold matrix are also made different for each color component. By randomly changing the threshold matrix for each color component, it is possible to suppress overlapping moire.

Next, discussion will be made on another example of generation of the threshold matrix by the image recording system 1. Though the basic operation flow for another exemplary generation of the threshold matrix is the same as that shown in Steps S11 to S16 of FIG. 4.

Figure 13:
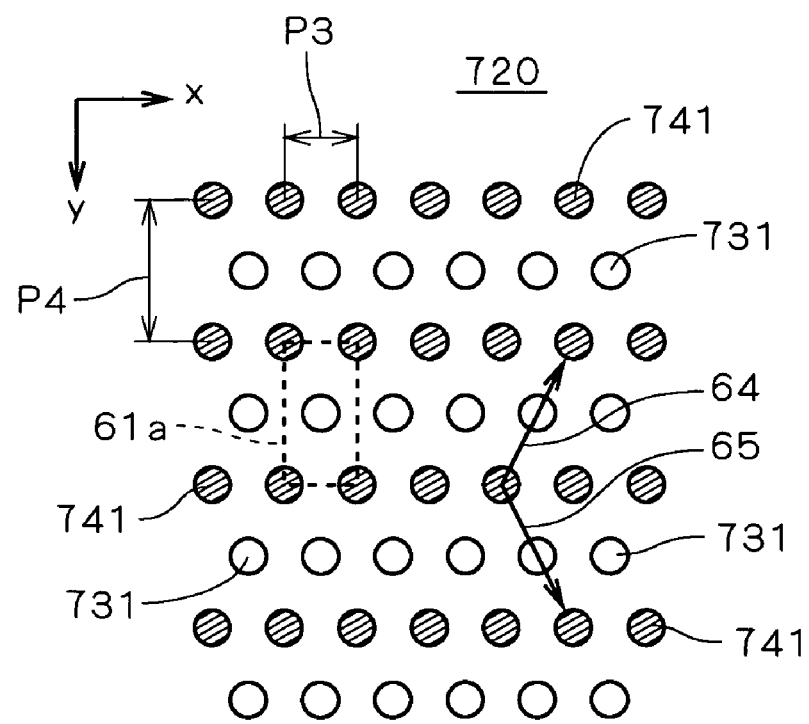
FIG. 13 is a view showing the dot centers arranged in the matrix area.

In this operation, a plurality of highlight-side dot centers 731 and a plurality of shadow-side dot centers 741 are arranged alternately at regular intervals along two arrangement directions (indicated by the arrows 64 and 65 in FIG. 13) which are inclined at the same angle clockwise and counterclockwise with respect to the x direction in the matrix area 720 of FIG. 13 (Step S1), and at this time, a quadrangle 61a formed of four shadow-side dot centers 741 serving as vertices adjacent to one highlight-side dot center 731 is a rectangle having longer sides in the y direction. In a case where the original arrangement of the dot centers 731 and 741 (see FIG. 5) is changed so that the density in the x direction should be made twice in the above operation, for example, a pitch P3 of the dot centers 731 and 741 in the x direction is four pixels and a pitch P4 in the y direction is eight pixels on both the highlight and shadow sides.

In the matrix area 720, the reference points whose number is a quarter of the number of highlight-side dot centers 731 and shadow-side dot centers 741 or less are distributed and set almost uniformly (Step S12), and such a rotation angle is obtained with respect to each of the dot centers 731 and 741 as to become smaller as the distance between the each dot center 731 or 741 and the nearest reference point becomes longer (Step S13). Subsequently, the dot centers 731 and 741 are rotated about the nearest reference point (Step S14), and the uniformity in distribution of the dot centers 731 and 741 after rotation is improved (Step S15). Then, the threshold values in the matrix area 720 are determined so that the halftone dot areas should be changed around a plurality of highlight-side dot centers 731 after being rotated in accordance with the variation in gray level on the highlight side of the original image and the halftone dot area (i.e., joined dot areas) should be changed around a plurality of shadow-side dot centers 741 after being rotated in accordance with the variation in gray level on the shadow side.

Figure 14:
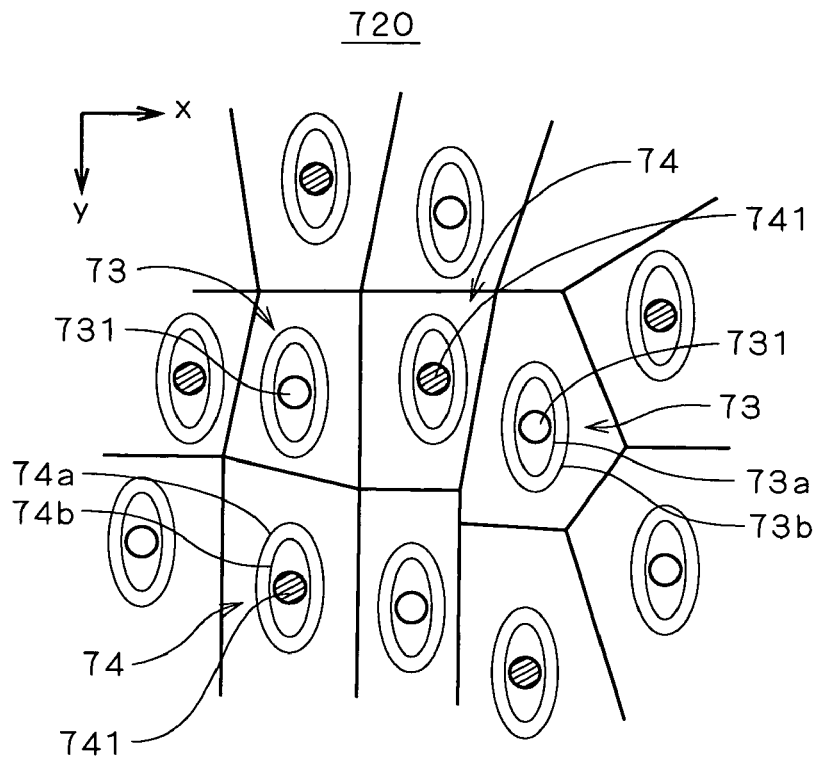
FIG. 14 is a view showing a state where the halftone cells are set.

FIG. 14 is a view showing a state where the halftone cells 73 and 74 are set around the dot centers 731 and 741, and this also shows the change in size of dots (halftone dot areas) written in the halftone cell 73 or 74 in accordance with the variation in gray level of the original image. The computer 11 determines the threshold values of the matrix area 720 so that each boundary of halftone dot areas which grows in accordance with the increase in the gray level of the original image on the highlight side should be an ellipse which is longer in the y direction as indicated by the lines 73a and 73b in FIG. 14 and each boundary of the halftone dot area which grows in accordance with the increase in the gray level of the original image on the shadow side should be an ellipse which is longer in the y direction as indicated by the lines 74a and 74b. In determining the threshold value in this operation, however, the boundaries of the halftone dot area does not necessarily have to be ellipses but may have other shapes only if longer in the longitudinal direction of the quadrangle 61a.

Figure 15:
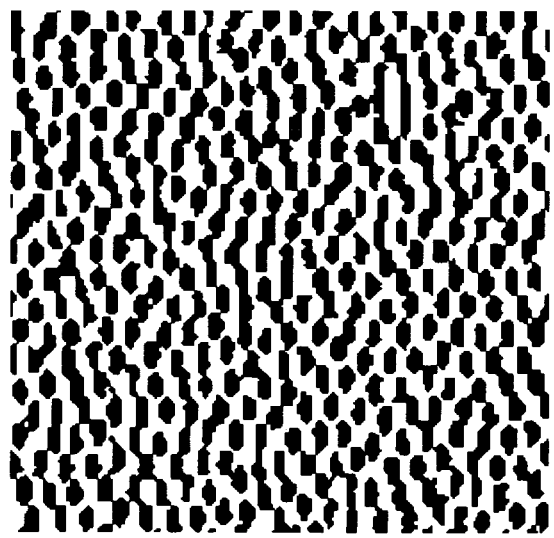
FIG. 15 is a view showing the halftone dot image.

FIG. 15 is a view showing an example of halftone dot image formed by using the generated threshold matrix, and this is the halftone dot image formed when the original image has a uniform gray level. In the halftone dot image of FIG. 15, the dots having directivity are arranged in a random fashion without density difference, and it can be seen that the halftone dots having directivity can be thereby generated by using the threshold matrix and a halftone dot image with moire free and less graininess can be generated. The threshold matrix generated in this operation may be recorded in some other writable recording medium 91b to generate a halftone dot image in some other image recording system or the like. If the original image is a grayscale color image (i.e., full color image), the highlight-side dot centers and the shadow-side dot centers are arranged so that the longitudinal direction of the quadrangle 61a formed in the matrix area 720 is made different for each color component and the threshold values are determined so that the boundary of the halftone dot area should be longer in the longitudinal direction of the quadrangle 61a with respect to each of the dot centers after rotation, to generate the threshold matrix, and it is thereby possible to further suppress overlapping moire.

Though the preferred embodiment of the present invention has been discussed above, the present invention is not limited to the above-discussed preferred embodiment, but allows various variations.

Though the operation for improving the uniformity in distribution of the dot centers 731 and 741 after rotation (Step S15 of FIG. 4) is performed to further suppress graininess in the generated halftone dot image in the above-discussed preferred embodiment, Step S15 may be omitted depending on the quality required for the generated halftone dot image Though the threshold matrix generated in the above-discussed is used for generation of binary halftone dot which corresponds to ON/OFF of one light beam in the image recording apparatus 12, if a printing apparatus which allows multitone (or multi-level) representation for one pixel (herein, multitone representation for each pixel by the dithering method is included), such as a direct printing apparatus or an ink-jet printing apparatus, is used, a threshold matrix used for generation of multitone halftone dots may be generated by the above method of generating a threshold matrix. In this case, a plurality of threshold matrixes whose distributions of threshold values are similar and average values of threshold values are different are obtained for each color component, and the gray level of each pixel in the original image is compared with a plurality of threshold values in a plurality of threshold matrixes, to determine with which density (or tone) writing should be performed.

In the image recording apparatus 12, if the recording stability is low in a case where writing is performed on only one pixel and not performed on the other pixels around this pixel, it is preferable that a plurality of threshold values near the highlight-side dot center 731 in a threshold matrix 710 should be so corrected as to be equal values so that the minimum dot size (minimum cluster size) should be 2×2 pixels (or 1×2 pixels).

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-296182 filed in the Japan Patent Office on Oct. 8, 2004, the entire disclosure of which is incorporated herein by reference.

What is claimed is:

1. A method of generating a threshold matrix which is used for generation of a halftone dot image representing a grayscale original image, comprising the steps of:
    a) arranging a plurality of highlight-side dot centers and a plurality of shadow-side dot centers alternately at regular intervals in predetermined two arrangement directions in a matrix area for storing a threshold matrix;
    b) setting reference points as many as or less than a quarter of the number of said plurality of highlight-side dot centers and said plurality of shadow-side dot centers, to be distributed substantially uniformly in said matrix area;
    c) rotating each dot center included in said plurality of highlight-side dot centers and said plurality of shadow-side dot centers about a nearest reference point; and
    d) determining threshold values in said matrix area so that halftone dot areas are changed around said plurality of highlight-side dot centers after being rotated in accordance with variation in gray level on a highlight side and a halftone dot area is changed around said plurality of shadow-side dot centers after being rotated in accordance with variation in gray level on a shadow side.

2. The method according to claim 1, wherein
    a rotation angle with respect to said each dot center becomes smaller as a distance between said nearest reference point and said each dot center becomes longer in said step c).

3. The method according to claim 1, wherein
    the total number of said plurality of highlight-side dot centers and said plurality of shadow-side dot centers is not smaller than twenty times and not larger than four hundreds times the number of said reference points.

4. The method according to claim 1, further comprising the step of
    improving uniformity in distribution in said plurality of highlight-side dot centers and said plurality of shadow-side dot centers between said step c) and said step d).

5. The method according to claim 1, wherein
    said two arrangement directions are orthogonal to each other and arrangement pitches of dot centers in said two arrangement, directions are equal to each other in said step a).

6. The method according to claim 1, wherein
    a quadrangle having vertices of four shadow-side dot centers adjacent to one highlight-side dot center is a rectangle having longer sides in said step a), and
    said threshold values are determined so that each boundary of a halftone dot area(s) has a shape which is longer in the longitudinal direction of said rectangle in said step d).

7. A computer-readable recording medium in which data of a threshold matrix used for generation of a halftone dot image representing a grayscale original image is recorded, said data being generated by executing steps including the steps of:
    a) arranging a plurality of highlight-side dot centers and a plurality of shadow-side dot centers alternately at regular intervals in predetermined two arrangement directions in a matrix area for storing a threshold matrix;
    b) setting reference points as many as or less than a quarter of the number of said plurality of highlight-side dot centers and said plurality of shadow-side dot centers, to be distributed substantially uniformly in said matrix area;

c) rotating each dot center included in said plurality of highlight-side dot centers and said plurality of shadow-side dot centers about a nearest reference point; and d) determining threshold values in said matrix area so that halftone dot areas are changed around said plurality of highlight-side dot centers after being rotated in accordance with variation in gray level on a highlight side and a halftone dot area is changed around said plurality of shadow-side dot centers after being rotated in accordance with variation in gray level on a shadow side.

8. The recording medium according to claim 7, wherein a rotation angle with respect to said each dot center becomes smaller as a distance between said nearest reference point and said each dot center becomes longer in said step c).

9. The recording medium according to claim 7, wherein the total number of said plurality of highlight-side dot centers and said plurality of shadow-side dot centers is not smaller than twenty times and not larger than four hundreds times the number of said reference points.

10. The recording medium according to claim 7, wherein said steps for generating said data further including the step of improving uniformity in distribution of said plurality of highlight-side dot centers and said plurality of shadow-side dot centers between said step c) and said step d).

11. The recording medium according to claim 7, wherein said two arrangement directions are orthogonal to each other and the arrangement pitches of dot centers in said two arrangement directions are equal to each other in said step a).

12. The recording medium according to claim 7, wherein a quadrangle having vertices of four shadow-side dot centers adjacent to one highlight-side dot center is a rectangle having longer sides in said step a), and said threshold values are determined so that each boundary of a halftone dot area(s) has a shape which is longer in the longitudinal direction of said rectangle in said step d).

* * * * *